United States Patent [19]

Freeman

[11] Patent Number: 5,487,135
[45] Date of Patent: Jan. 23, 1996

[54] RULE ACQUISITION IN KNOWLEDGE BASED SYSTEMS

[75] Inventor: Paul R. W. Freeman, Southville Bristol, England

[73] Assignee: Hewlett-Packard Company, Palo Alto, Calif.

[21] Appl. No.: 289,838

[22] Filed: Aug. 12, 1994

Related U.S. Application Data

[63] Continuation of Ser. No. 799,300, Nov. 27, 1991, abandoned, which is a continuation-in-part of Ser. No. 438,487, Feb. 12, 1990, abandoned.

[51] Int. Cl.$^6$ ..................................................... G06F 15/18
[52] U.S. Cl. .............................................................. 395/75
[58] Field of Search ................................... 395/75, 76, 12

[56] References Cited

U.S. PATENT DOCUMENTS

| | | | |
|---|---|---|---|
| 4,752,889 | 6/1988 | Rappaport et al. | 364/513 |
| 4,816,994 | 3/1989 | Freiling et al. | 364/200 |
| 4,945,476 | 7/1990 | Bodick et al. | 364/413.02 |

FOREIGN PATENT DOCUMENTS

| | | |
|---|---|---|
| 2607284 | 5/1988 | France . |

OTHER PUBLICATIONS

Topper, A., "Building up to IEW/WS," PC Tech Journal, Sep. 1988, 110–123.
Kandt, K., "AIS: A Foundation for Practical Artificially Intelligent Systems," Jan. 1989, Proc. 22nd Hawaii Intl. Conf. on System Sciences, 685–692.
Davis et al., "Modeling Semantic Constraints with Logic in the EARL Data Model," Proc. 5th Conf. on Data Engineering, Feb. 1989, 226–233.
Product Focus: Case Tools, BYTE, Dec. 1989, 154–171.
Blackman, M. J., "CASE for Expert Systems," AI Expert, Feb. 1990, 27–31.
Han, et al, "KPSP: A Knowledge Programming System based on Prolog," 4th Int'l Conf. on Entity–Relationship Approach, Oct. 1985, 2–9.
Carlo Zaniolo, "Prolog: A Database Query Language for All Seasons", Expert Database Systems, pp. 219–232, 1986.
J. R. Olson and H. H. Rueter, "Extracting Expertise From Experts: Methods For Knowledge Acquisition", Expert Systems, Aug. 1987, vol. 4, No. 3.
M. Adiba and G. T. Nguyen, "Handling Constraints and Meta–Data on a Generalized Data Management System", Expert Database Systems, pp. 487–504, 1986.
Briand et al., "Expert System for Translating An E–R Diagram Into Databases", The 4th International Conference on Entity–Relationship Approach, pp. 199–206, 1995.

*Primary Examiner*—Robert W. Downs

[57] ABSTRACT

A rule-based system, concerned with a domain of knowledge or operations (the domain theory) and having associated therewith a rule-based entity relationship (ER) system (the ER theory) which represents the domain theory diagrammatically, is supported by a computer system. The system, which constructs a new rule for the domain theory, controls the entry into conditions storage memory or note pad (16) of conditions which together represent the desired rule, and rule assembly logic (17) that generates the desired rule from those entries. A display device (14) displays an ER diagram (FIG. 2) obtained from the ER theory and stored in memory (11, 12). An operator selects, via a mouse and control logic (13, 15), elements of the ER diagram. These elements are entered into the conditions storage means or note pad (16). Attributes are entered via a combination of selection from the ER diagram and semantic constraints on their values. When all elements and attributes have been so entered, they are compiled into the new rule by rule assembly logic (17) and assimilated into the domain theory by assimilator logic (18).

15 Claims, 8 Drawing Sheets

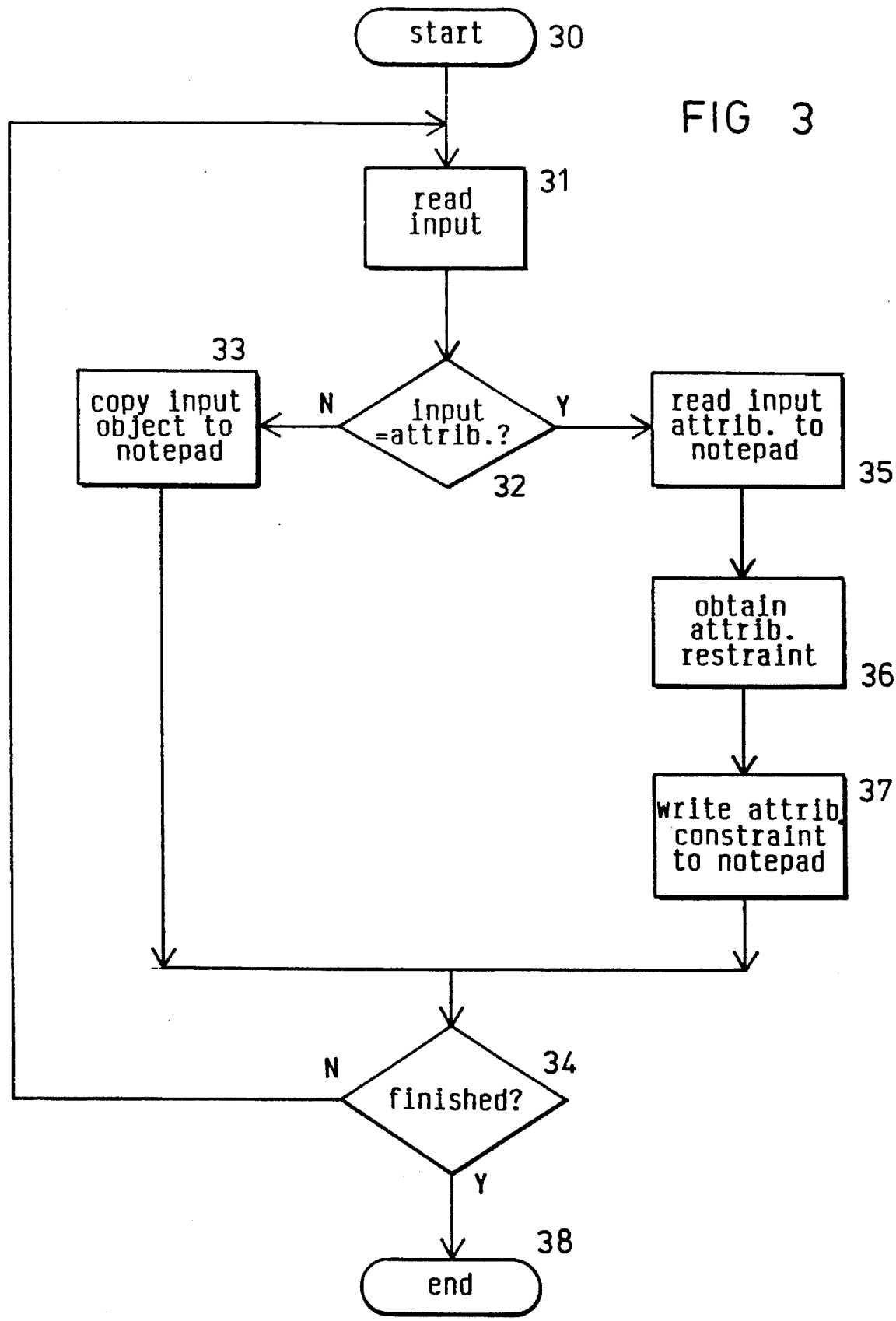

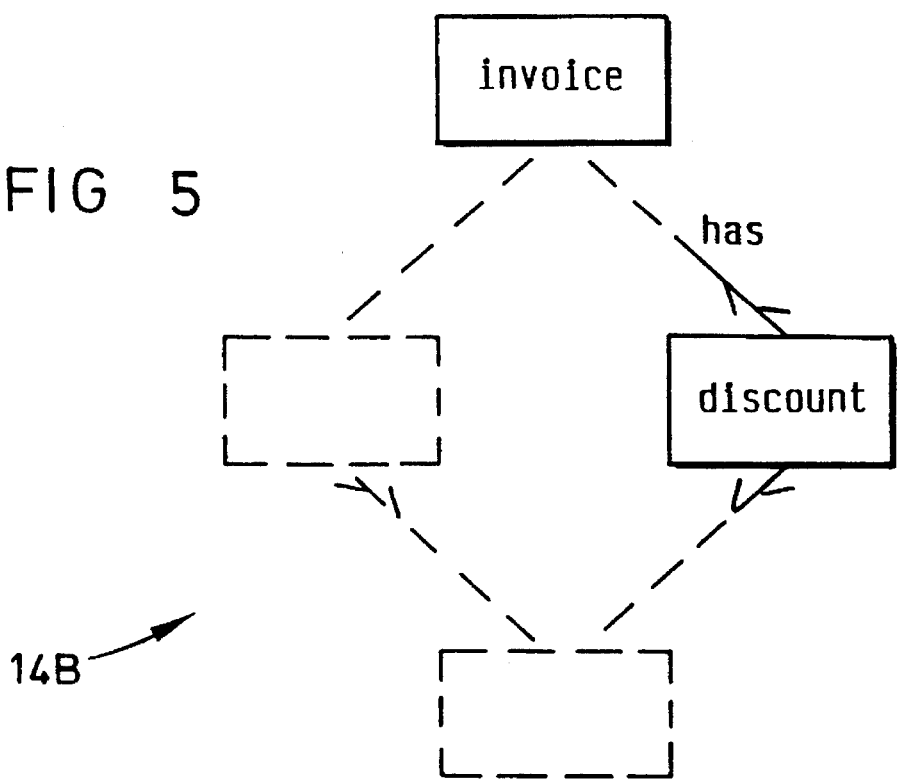
FIG 5
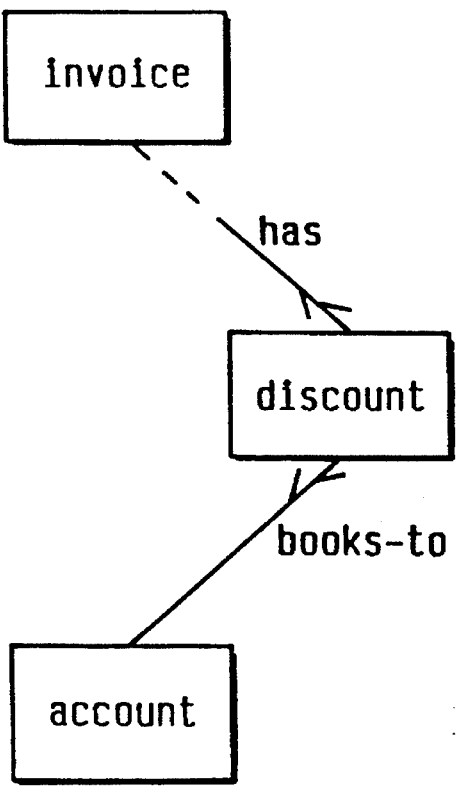

FIG 4
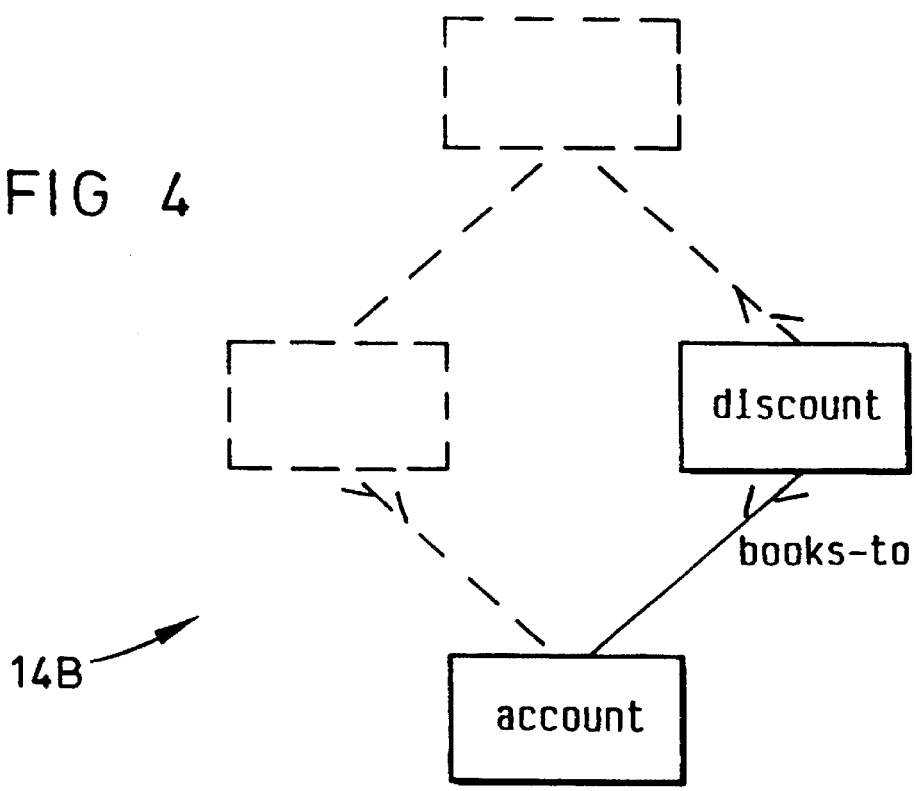
14B
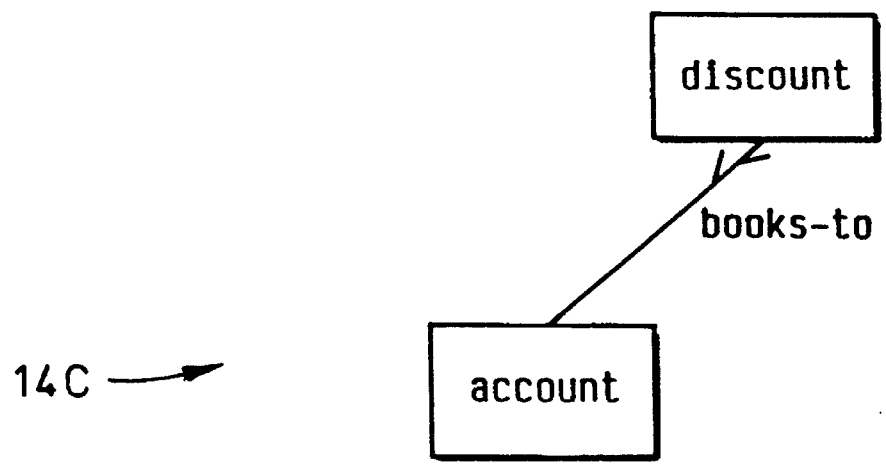
14C

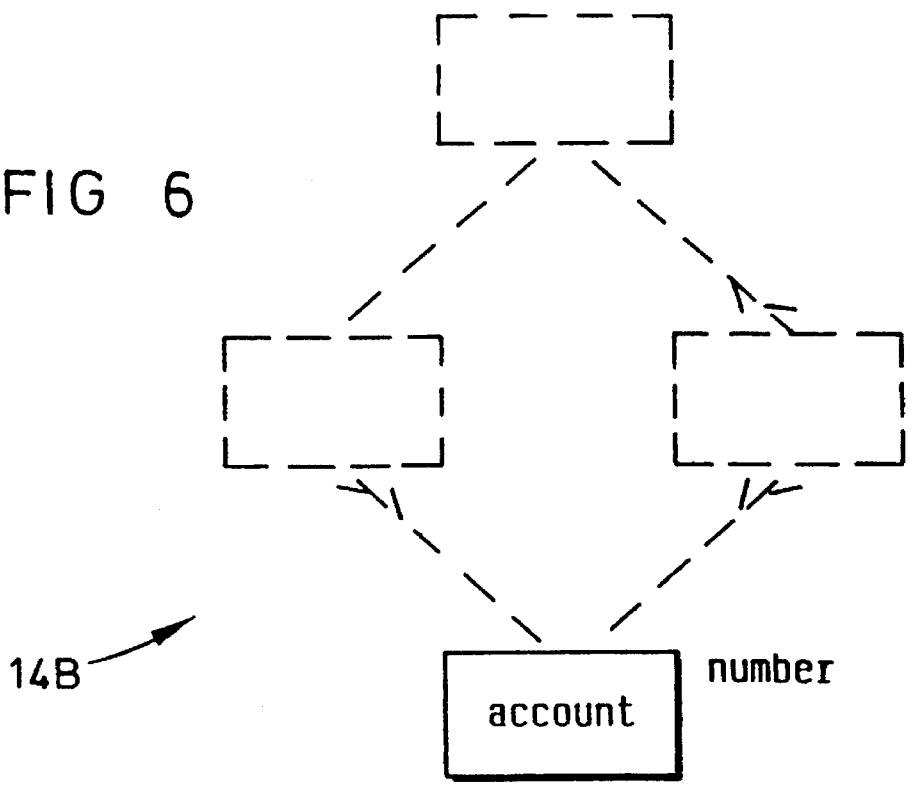
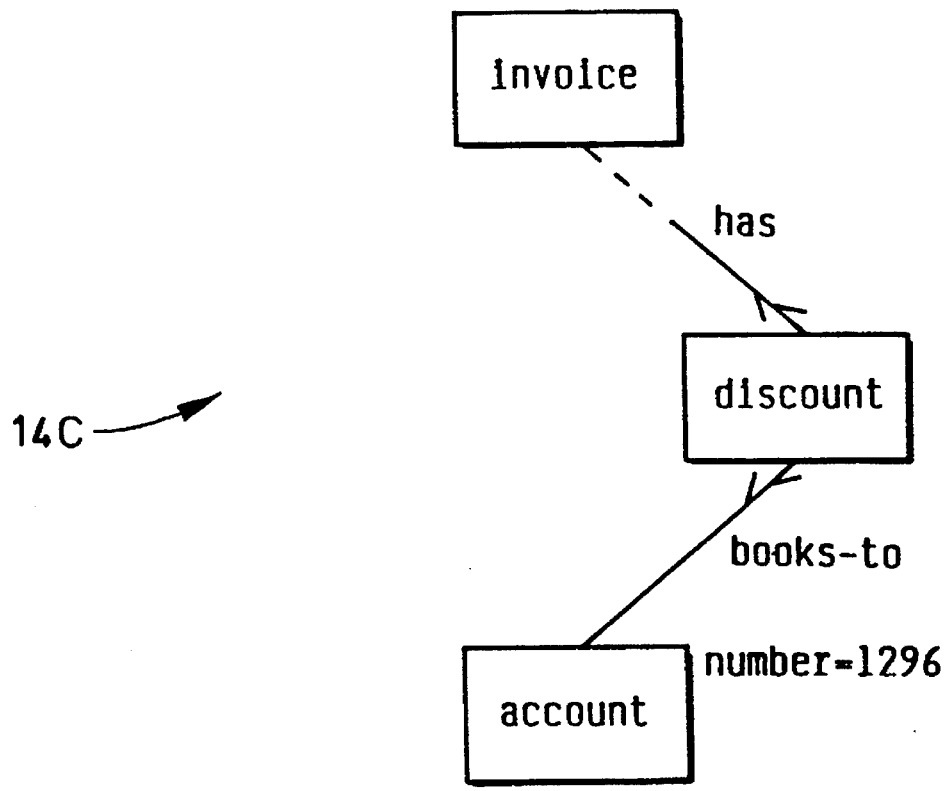

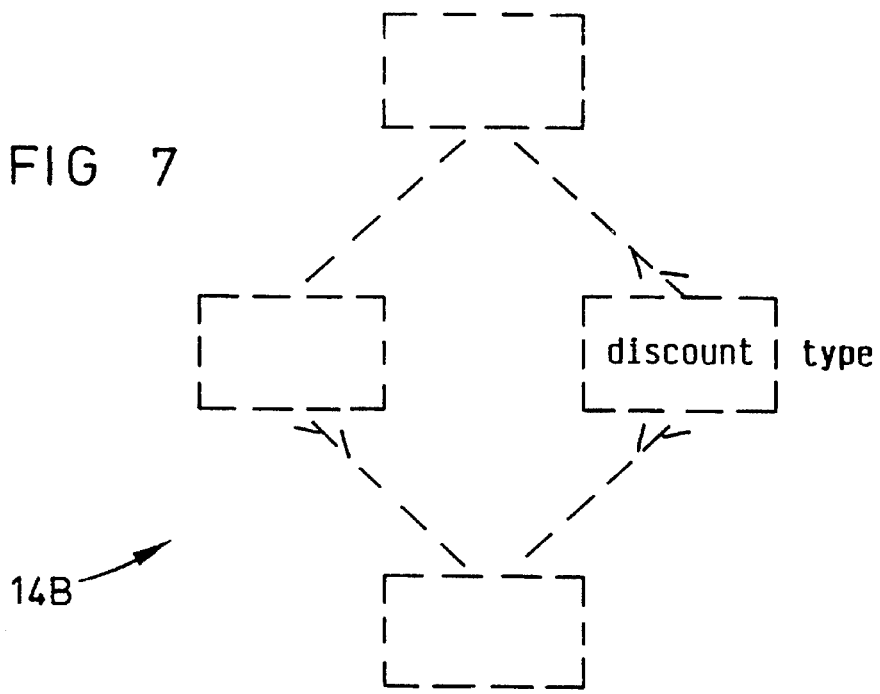
FIG 7
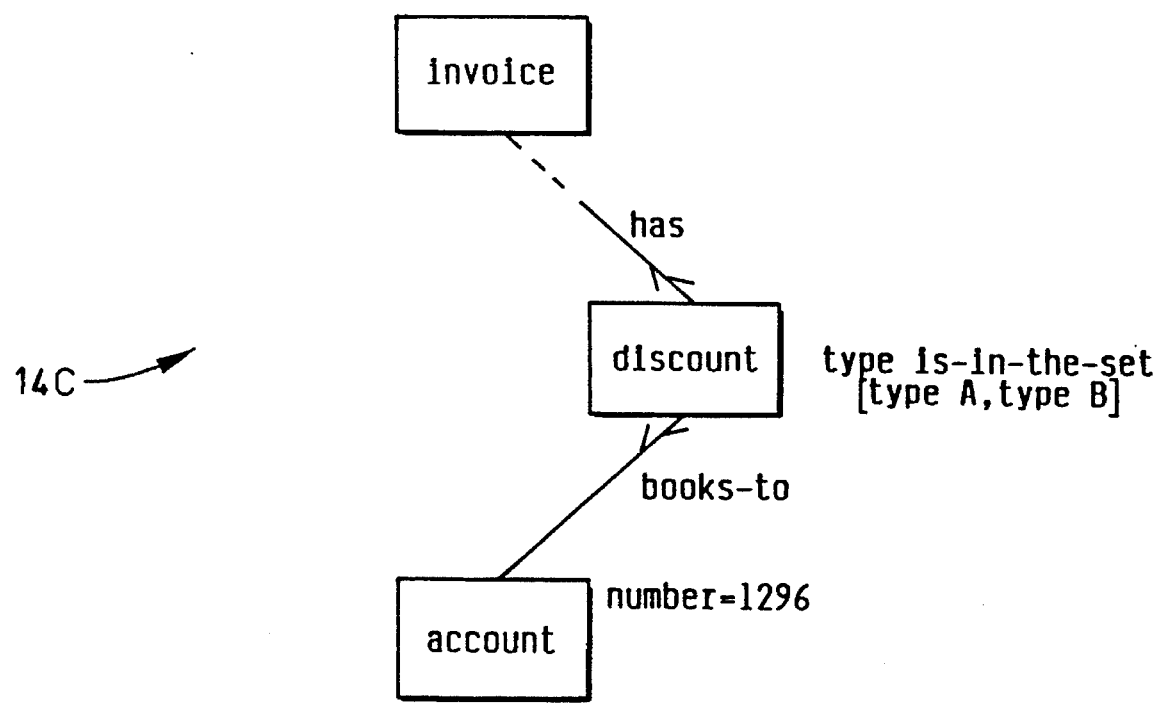

FIG 8
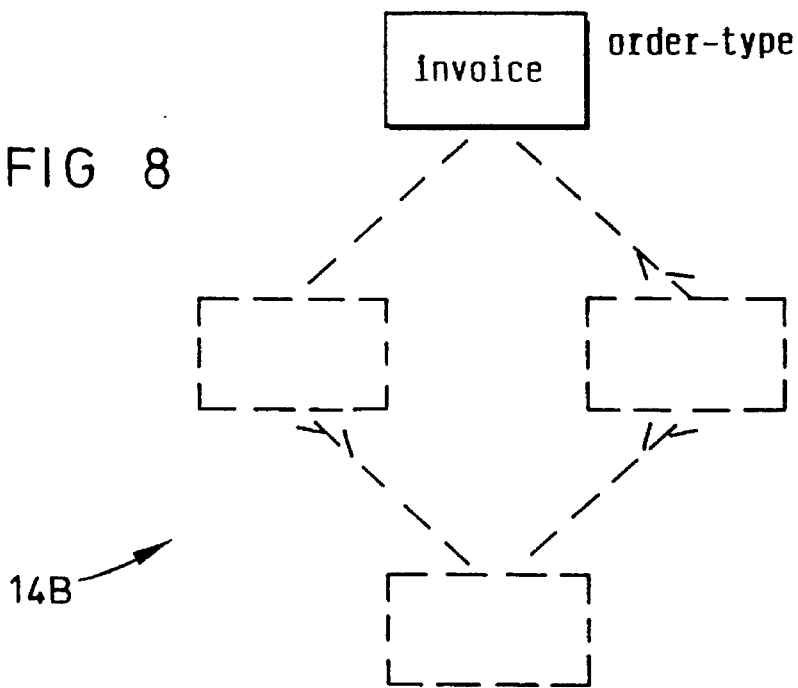
14B
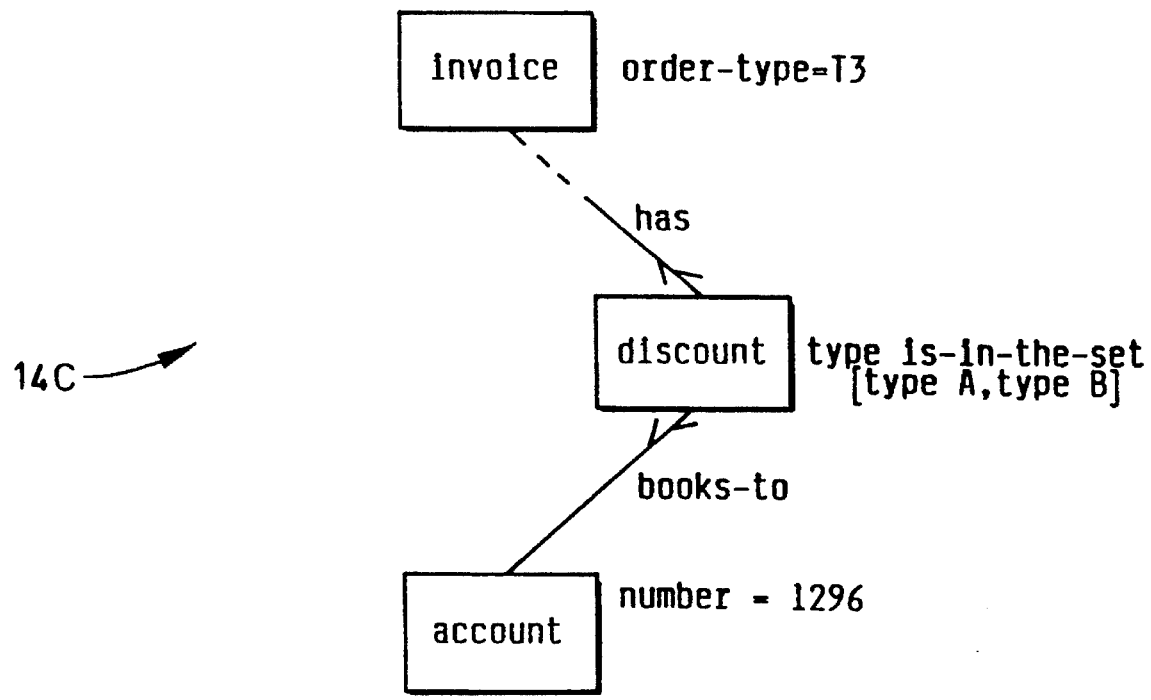
14C

RULE ACQUISITION IN KNOWLEDGE BASED SYSTEMS

BACKGROUND OF THE INVENTION

This is a continuation, Ser. No. 07/799,300, filed Nov. 27, 1991, now abandoned which is a continuation-in-part of application Ser. No. 438,487, filed Feb. 12, 1990.

The present invention relates to rule based systems (which include expert systems, knowledge based systems and information management systems) and more specifically to knowledge acquisition in such systems.

An expert system is a data processing system which is capable of operating on some domain of knowledge. The knowledge which human experts have about the domain and the modes of reasoning which those experts employ in reasoning about the domain are captured and represented, more or less accurately, by a collection of statements or rules. The system comprises these rules together with an inference engine, so that queries which are put to the system are processed in accordance with the rules to yield answers which are rational deductions from the rules - that is, from the incorporated knowledge of the experts. Such systems are now becoming well established.

Early systems were constructed by knowledge engineers who interviewed the experts and constructed the system from the information so gained. This process requires large amounts of the time of the knowledge engineers as well as the experts. There is an obvious and continuing need to improve the accessibility of such systems. The level of skill and knowledge demanded of the users of such knowledge based systems has to be reduced as far as possible, so that those potential users of such systems who are expert in the relevant domain of knowledge but unskilled in information technology can use such systems without having to undergo lengthy training (or alternatively having to call on the services of knowledge engineers to aid them). Specifically, there is a need to provide appropriate tools to those who possess knowledge or whose job involves managing knowledge or business procedures, to enable them to codify such knowledge or procedures in a machine understandable form, i.e. as rules. One approach to this problem has been the development of expert system shells. A shell is a rule based system including an inference engine but lacking any domain specific knowledge. Instead, the shell includes a knowledge acquisition interface which guides the expert user in entering his knowledge about his domain of knowledge.

However, this approach has various drawbacks. Users find it hard to learn the complex rule syntaxes which are generally incorporated in the knowledge acquisition interfaces of such shells. Also, users need access to a "domain lexicon" before they start defining their knowledge, but normal shells only provide users with a rule syntax, leaving them without a starting point from which they can begin to define their own knowledge.

In addition to these general matters, there are certain specific matters which are at present unsatisfactory. For example, there is a particular need to be able to unify data in existing databases with rules in knowledge based systems. This is crucial for the development of business systems. Also, there is a need to enable users to locate and read existing rules in knowledge based systems. This is a problem analogous to providing a query language for a database, only in this case we need a "query language" for rules rather than data.

Expert systems are an example of a wider category, that of rule based systems, and broadly the same considerations apply to this wider category. An example of a knowledge based system which is not usually thought of as an expert system is a rule-based complicated accounting system. Such a system may incorporate a large number of rules, relating for example to the treatment of different customers in dependence on their regularity of ordering, their promptness in paying, their geographical location, the profile of the goods they order in different categories of goods, etc. Another type of rule based system is a knowledge management system, which is a database organized around internal rules rather than containing only "pure data".

SUMMARY OF THE INVENTION

In accordance with this invention, method and apparatus are provided for constructing a new rule for use in a computer system supporting a rule-based system concerned with a domain of knowledge or operations (the domain theory) and having associated therewith an entity relationship (ER) system (the ER theory) which relates to the domain theory and which can be represented diagrammatically. The present invention encompasses apparatus comprising display means for displaying an ER diagram obtained from the ER theory, conditions storage means for storing conditions which represent a new rule, control means for selecting elements of the ER diagram and storing said elements and related expressions as conditions in said conditions storage means, and rule assembly means for generating the new rule from conditions stored in said conditions storage means.

Methods encompassed by the present invention comprise the steps of displaying an ER diagram obtained from the ER theory, selecting elements of the ER diagram and related expressions for use in constructing a new rule, storing the selected elements and related expressions as stored conditions which represent a new rule, and generating the new rule from at least the stored conditions.

The invention provides for displaying an ER diagram obtained from the ER theory and elements of the ER diagram and related expressions are selected for use in constructing a new rule. The elements and related expressions are then stored representing the new rule and the new rule is generated from the stored conditions. Thus the apparatus and method of operation provides a technique for the construction of new rules using interactive graphics as the main channel of communication with the user. Specifically, the system takes advantage of a family of diagrammatic conventions known collectively as the entity-relationship approach as a style of diagram which is well suited as an interface for creating, viewing, modifying and managing sets of rules for knowledge based or expert systems. The approach also applies to other uses of rules, for example for describing semantic integrity constraints for databases.

The apparatus and method of operation preferably uses commercially standard ER type diagrams, of which there are many syntactic varieties. This improves market acceptability and compatibility with existing system analysis and design techniques. In the context of expert system shells, the present system makes syntactic aspects of rule construction very simple and gives the user a domain specific lexicon to work with. A system analyst may be needed to set up the system initially, but he or she need generate only a skeleton of rules which can then be fleshed out by the user.

The invention permits the construction of any number of domain theory rules which relate to the ER diagram. It differs considerably from other systems which have been used to build relational database queries from ER diagrams. In the case of such systems a single query is constructed and its use is simply in retrieving data from a database. In the case of the current invention a number of rules are constructed which then are incorporated into another software system to become a new program module. The set of rules taken together specify how that other software system is to behave. Thus the current invention is not simply a query generator but rather a system for machine assisted generation of software modules.

As a more general matter, the present apparatus and method of operation take advantage of the close relationship between ER diagrams, relational databases and Prolog programs, and the actual implementation provides a unified model for querying and defining knowledge bases. The entity-relationship approach provides a view of data in existing databases and yet it also provides a natural way of communicating with knowledge bases. Thus it offers a powerful tool for unifying knowledge and data processing.

BRIEF DESCRIPTION OF THE DRAWINGS

FIG. 3 is a flow diagram of the first phase of the operation of the system.

FIGS. 4 to 8 show displays occuring at various stages of this first phase.

DETAILED DESCRIPTION OF PREFERRED EMBODIMENT

Figure 1:
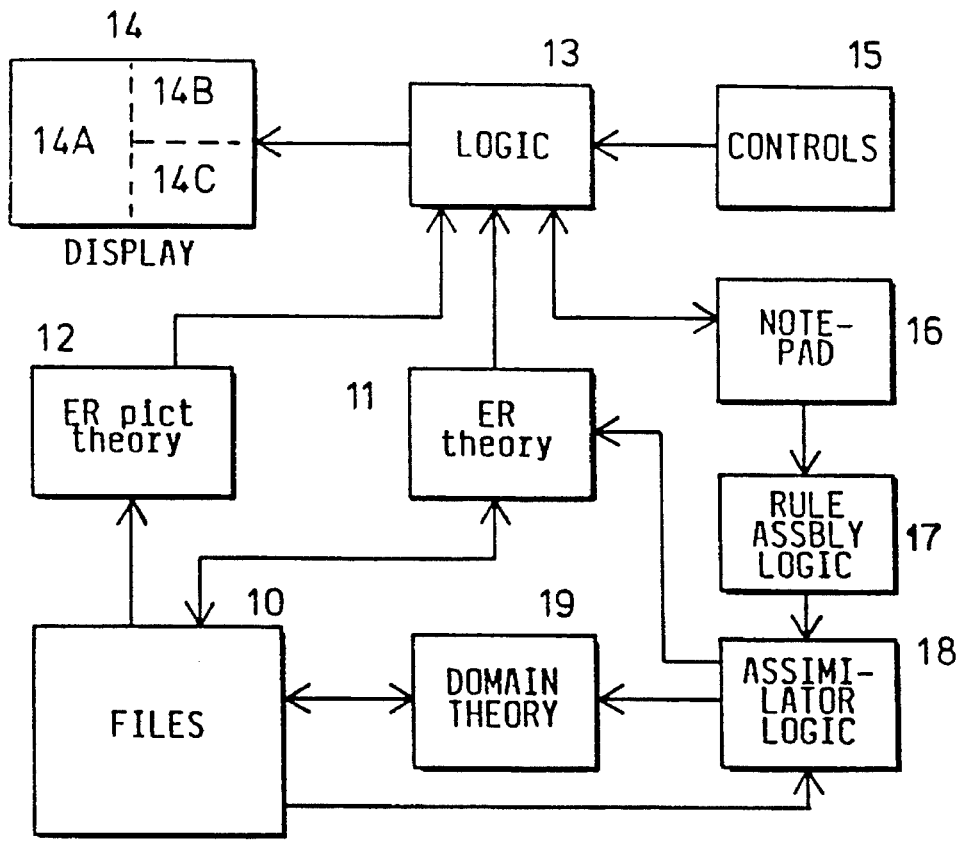
FIG. 1 is a block diagram of the system.

The present invention operates in a computer system having a rule-based system concerned with some domain of knowledge or operations. The set of rules relating to this domain is termed the domain theory. Associated with this domain theory there is an Entity Relationship (ER) theory, which is capable of generating an ER diagram showing at least the entities of the domain theory and the binary relationships between them, and preferably also showing attributes of the entities.

The invention is concerned specifically with means and a method for generating new domain theory rules in such a system. Hitherto, in order to generate a new rule, the user has had to construct a rule in the language of the domain theory, or a higher level language which can be compiled into the domain theory language. Techniques for guiding the user in such rule construction have been developed, but the construction of new rules has nevertheless been a relatively arduous task, demanding considerable knowledge of the language from the user for success.

By the invention, means and method are provided for constructing a new domain theory rule graphically, the user extracting entities and relationships from the ER diagram, and the system and method then constructing the desired rule from the entities and relationships so extracted. Preferably, the ER theory includes information relating to attributes of entities, these being displayed in the ER diagram, and the system includes means whereby the user can select these attributes, and means for prompting the user to enter values for these attributes, the selected attributes and their values being stored in the notepad.

Prolog

The present specification assumes a basic knowledge of logic programming such as that possessed by any skilled worker in the field. In particular, some knowledge of the logic programming language Prolog is assumed (for a basic text, refer to "Programming in Prolog" W. F. Clocksin and C S Mellish, Springer-Verlag, 1984). As an aid in understanding the invention, however, an exceedingly brief summary of Prolog is as follows. This summary is of course far from precise; for accuracy, reference must be had to a standard text on Prolog, such as the Clocksin and Mellish book.

Prolog is a declarative language designed primarily for symbolic, non-numeric computation, and a Prolog program consists of a set of fact and rule statements. There is almost nothing corresponding to the program structure of, say, Fortran.

For present purposes, the ultimate elements of Prolog are constants. Variables also, of course, exist in Prolog, though they are "ultimately" (in the sense just used) instantiated as ("replaced by") constants. A constant is normally written with an initial lower-case letter (e.g. john) a variable with an initial uppercase letter (e.g. X or Father).

A typical simple prolog fact statement has the form parent(john,susan), which can be taken as meaning that john is the parent of Susan. A query or goal has the same form as a fact statement preceded by a query symbol ?. Thus ?parent(john,Child) is a query. A Prolog system will recognize a query, identify the variables in it (in this case Child, identified as a variable by its initial upper-case letter), and try to find a "solution" to the implied goal of finding a constant which makes the query statement true. (In this case, the variable Child is instantiated as the constant susan.) A fact statement can have any number of arguments, and any of these can be variables; if the fact statement is a query, the system tries to find constants for all these variables. (A goal or query can consist of a combination of statements, so that for example a variable has to satisfy two or more query statements together.)

More general relationships are expressed as rules, which are composed of statements having the same general form as fact statements. An example of a relationship is

```
grandfather(X,Y) :-
    father(X,Z),
    father(Z,Y);
    father(X,Z),
    mother(Z,Y).
```

(Here the comma indicates logical D, so that for example father(X,Z) and father(Z,Y) must both be true, while the semicolon indicates logical OR, so that grandfatherhood can be paternal or maternal.) The system is able to utilize the rules to draw logical conclusions in trying to satisfy a goal or query; in other words, if it finds that the left-hand portion of a rule might satisfy a query, it is able to set up the right-hand side as one or more subqueries.

A fundamental feature of Prolog is that rules can be recursive. A simple example is

```
ancestor(X,Y): -
    parent(X,Y).
ancestor(X,Z): -
    parent(X,Y),
    ancestor (Y, Z).
```

The second rule defines the ancestorhood relationship recursively. A recursive relationship like this must always be accompanied by an alternative non-recursive rule for the same relationship; here, the first rule defines the required alternative ancestorhood relationship. (There are also further limitations which must be observed if the danger of infinite regress is to be avoided.)

The normal convention in Prolog is that the operator or functor of a statement is placed at the left-hand end of the statement. That is, parent(X,Y) is written rather than X is_parent_of Y. This convention will be largely maintained herein. But it is possible to define infix operators and functors; internal conversion to prefix operators and functors is normally automatic, and conversion the other way can also be achieved readily. It is also straightforward to obtain representations of Prolog statements in English-like form, so that Prolog statements such as entity (e1, invoice).

entity (e2, gross).

entity (e4, account).

relationship (r1, has, e1, e2, 1:1).

relationship (r3 book_to, e2, e4, n:1).

can be presented to a user in forms such as

Relationship r1: invoice has gross

Relationship r3: book gross to account which are more readily understood by users who are familiar with the field being represented but are unfamiliar with conventional Prolog.

Prolog is primarily a declarative rather than a procedural language. The primary way to achieve something in Prolog is therefore by formulating a goal-a statement preceded by a query symbol. The system attempts to satisfy this goal, by looking for constants which can be substituted for the variables in the goal. In so doing, the system searches through the various statements, looking for ones which match the goal or some part of it. This may involve replacing a variable in the goal by a statement in the system, which then becomes a sub-goal. So statements can often be regarded as declarative formulations of what, in procedural systems, would be subroutines. (The ancestor rules above are a simple example of this.) The setting up of a subgoal in a Prolog system is broadly similar to the calling of a subroutine in a procedural system.

Although Prolog is primarily symbolic, it is possible to include numeric functions in it. In fact, some basic functions like addition of integers are normally built into the system, and more complicated functions can be defined in terms of these basic functions.

In the description which follows, the conventions of Prolog will be used, though somewhat loosely and informally. Further, some aspects of the invention will be described procedurally rather than declaratively. It will be realized that on the one hand, the invention can be implemented largely by means of declarative statements supported by a conventional Prolog or Prolog-like system; on the other hand, the invention can be implemented procedurally if required.

Domain and ER Theories

A rule-based system, such as an expert system, comprises a set of rules which are formulated explicitly, together with an inference engine for drawing conclusions from the rules in response to queries. Many other types of system are capable of being cast into a similar form; for example, a complicated accounting system can have the various rules (e.g. "for account no. so-and-so, give discount of such-and-such for orders for a certain class of goods over a certain value") represented explicitly, together with a processing engine which uses the rules to process transactions.

With such systems, it is often desirable to include a model which displays the entities in the domain and the relationships between them in a diagrammatic form. The term Entity Relationship (ER) system will be used herein for such a diagrammatic illustration or display system. (The term ER is used here in a general sense, not limited to any specific formal definition). The set of rules of the rule-based system has associated with it an ER model which represents the various relationships between the entities in the domain. An ER model essentially generates a diagram in which entities are displayed as elemental areas or boxes, and the relationships between them are displayed as linking lines or arrows.

A rule-based system is concerned with some particular domain, such as the accounting system of a particular organization, and we will call the set of rules the domain theory (so that individual rules are domain theory rules). The ER system may itself be a set of rules, the ER rules. The domain is defined by the domain theory, and the ER system represents this domain. The ER system may alternatively not be rule-based but may involve some other form of representation, and may be written in a procedural language such as C or Pascal.

The accuracy of the representation of the domain by the ER theory is limited, for various reasons.

A simple relationship between two entities can readily be illustrated by an arrow joining the two entity boxes. But complicated logical relationships cannot easily be expressed by arrows. Different types of arrows can be used, and linkages between arrows can be indicated by drawing "bags" round associated arrows and the boxes at their ends, or by joining them by "meta-arrows"; but these techniques are complicated and rapidly become unintelligible. Also, abstract conditions (e.g. age between 21 and 65) cannot easily be diagrammed.

Disregarding such complications, there is a 1-to-1 correspondence between the domain theory and the ER system (or theory). However, this is only a global correspondence, not a correspondence between individual domain rules and individual ER rules. On the one hand, a single domain rule which defines a complicated relationship may have various parts of that relationship expressed by different ER rules; and on the other, a single ER rule may represent parts of several different domain rules. This distinction arises from the differing purposes of the two theories. Each domain theory rule defines a single relationship of the theory in abstract terms, where the relationship may be a complicated one involving several variables.

The ER theory rules are primarily organized around binary relationships between pairs of variables, and a single binary relationship may be common to several domain theory rules. The ER theory is designed, of course, so that small areas of it can be displayed; it is obviously impracticable to display the whole of the ER theory at once, and if that were done, the result would be unintelligible.

The ER theory can itself be subdivided into two constituent theories, the ER semantics theory and the ER picture theory. A typical extract of rules from the former is given in Table II below. A typical selection of rules from the latter would be somewhat as follows:

TABLE I

Typical ER Picture Theory rules

X, Y, W, h,...)
text e1, X, Y, color, "invoice")
line(r1, X1, Y1, X2, Y2, color)

This is an informal and simplified example, but it indicates how the actual display or plotting aspects of the ER system are handled. The ER picture theory rules control the positioning of the various elements of the display on the display device. For present purposes, this subdivision of the ER theory can usually be disregarded, and the theory thought of as primarily the ER semantics theory.

Figure 2:
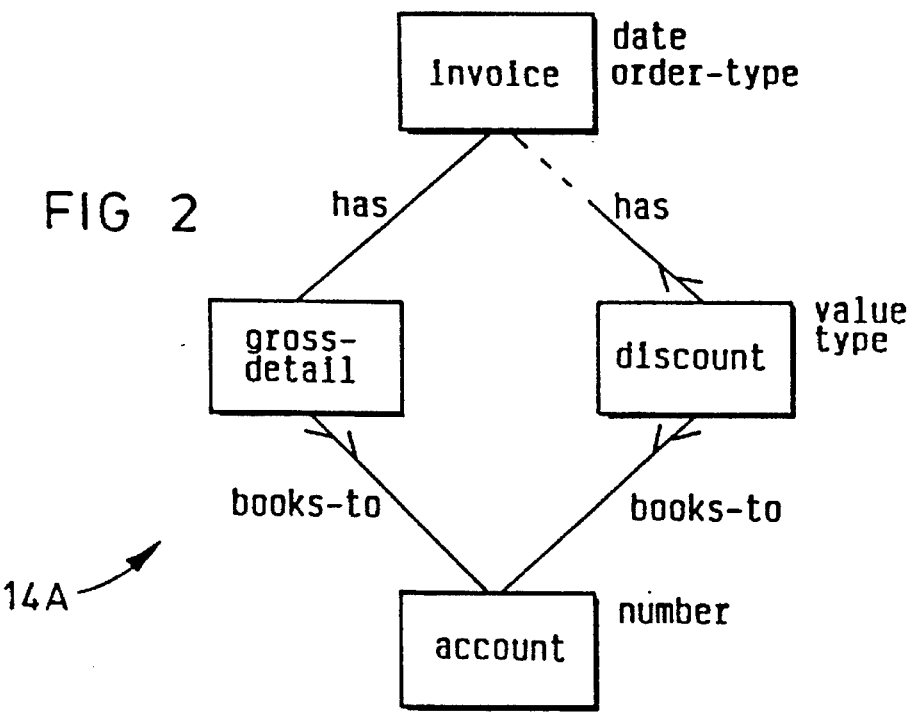
FIG. 2 is a typical ER diagram.

The present invention will be described with reference to an example set in the context of a complicated accounting system (the domain). FIG. 2 is a diagram of the ER theory associated with this system and Table II shows the corresponding rules from the ER theory. (Obviously, FIG. 2 and Table II are only fragmentary.)

TABLE II

Rules from ER theory corresponding to FIG. 2

```
p1:  entity(e1, invoice).
p2:  entity(e2, gross).
P3:  entity(e3, discount).
p4:  entity(e4, account).
p5:  relationship(r1, has, e1, e2, 1:1).
p6:  relationship(r2, has, e1, e3, 1:no).
p7:  relationship(r3, book_to, e2, e4, n:1).
p8:  relationship(r4, book_to, e3, e4, n:1).
p9:  attribute(a1, e1, date).
p10: attribute(a2, e1, order_type).
p11: attribute(a3, e2, value).
p12: attribute(a4, e3, value).
p13: attribute(as, e3, type).
p14: attribute(a6, e4, number).
p15: domain(a1, datatype).
p16: domain(a2, enum([O1, I1, T2, T3])).
p17: domain(a3, numeric).
p18: domain(a4, numeric).
p19: domain(aS, enum[ typeA, typeB]).
p20: domain(a6, numeric).
p21: entity_pattern(e1, invoice(date(D), order_type (O))).
p22: entity_pattern(e2, gross(value(V))).
p23: entity_pattern(e3, discount(value(V), type(T))).
p24: entity_pattern(e4, account(number(N))).
```

The relationship between this set of rules and the ER diagram of FIG. 2 (in which, to avoid confusion, no references have been added) is as follows. The four boxes correspond to the four entities e1 to e4, and the four lines joining them to the four relationships r1 to r4. (The "1:n" and "n:1" in relationships r1, r3, and r4 indicate that those relationships are potentially 1-to-many and many-to-1, and are indicated by the small branches on the corresponding lines. The "no" in r2 indicates that the lower limit for the "many" is 0 rather than 1, and this is indicated by the partially broken line in the diagram of FIG. 2.) The attributes a1 to a6 are shown adjacent to their associated entity boxes.

The ER diagram is shown with maximum information displayed; the names of the entities are given in their boxes, the names of the relationships are given on their lines, and the names of the attributes are all given. To some extent, the user may be given the power to simplify the diagram by deleting some of this information, e.g. the attributes. (Alternatively, of course, the system may initially display such a simplified diagram, with the user having the power to cause further information to be added so that all information is eventually displayed.)

It will be noted that there are properties of the system which are included in the ER theory but are not displayed as such on the ER diagram. In other words, the ER theory is not minimal in the sense of containing only what is essential for generating ER diagrams. Thus there are domain rules for the attributes (these define the domain restrictions of the attributes, e.g. one attribute must be a date and another must be a numeric value; these domains are of course entirely unrelated to the domain of the domain theory). Also, there are entity patterns for the entities. The reason why these properties are included in the ER system is that they are needed for the construction of the rule, as will be seen later.

In the present system, the ER diagram shows only binary relationship between entities, and shows attributes only of entities. In principle, however, more complicated relationship (ternary or even higher) could also be shown, and attributes of relationships as well as of entities could also be shown if desired (and provided that an adequate diagrammatic representation can be devised).

An ER theory will also normally have associated with it display control means for inspecting it. Such means in effect comprise a movable "window". The ER theory as a whole is in effect a very large diagram, and the window can be moved around to different parts of the whole notional diagram. The window is a logical rather than a geometrical window, in that it permits designated variables and/or relationship to be deleted from it. The contents of the window can be increased by asking the display control means to add new relationships to variables already in the window. (Conventionally, if a relationship is displayed, the two variables at the ends of the relationship are also displayed automatically, so there is no need to be able to ask the display control means to add new variables to a relationship which is already displayed.)

System Structure

FIG. 1 is a simplified block diagram of a computer system incorporating a domain theory, an associated ER theory (semantics theory plus picture theory), display means, and display control means. A main memory unit 10 contains all files of the system; such files include a variety of theories, including in particular a domain theory and the associated ER theory. To inspect the ER theory, that theory is extracted from the files storage unit 10 and passed to an ER theory storage unit 11, and the associated picture theory is extracted from the files storage unit 10 and passed to an ER picture theory unit 12. The two units 11 and 12 are coupled to a logic unit 13, which is in turn coupled to a display unit 14. A controls unit 15 is also coupled to the logic unit 14, and consists of control elements, such as a mouse with switches mounted on it, by means of which the user can feed control signals to the logic unit 13.

The ER theory is selected by e.g. being chosen by means of a conventional keyboard name entry, or by means of a conventional mouse selection from a list of theories on the display unit 14. That selection causes the theory to be fed to unit 11, and the associated picture theory to unit 12. The logic unit 13 then automatically displays an initial portion of the ER theory on the display unit 14. By means of the controls unit 15, the user can select particular parts (boxes and/or relationships) and either erase them or call for the display of further parts associated with them. (Alternatively, the logic unit 13 may initially display parts of the ER theory in tabular (menu) form, with the user selecting a desired part, by a true ER diagram display of the parts of the ER theory which include the initially selected element.)

The selection of elements by means of the controls unit 15 is conventional. The logic unit 13 monitors the way the controls unit (e.g., a mouse) is moved by the user and maintains a pair of co-ordinates accordingly. It generates a marker on the display with corresponding co-ordinates, moving it around the display to match the way the mouse is moved. When control switches on the controls unit 15 (mouse) are operated, the logic unit 13 compares the mouse co-ordinates with the coordinates of the various parts of the display; a match (within certain small error limits) identifies the part of the display, and hence the element (box or relationship) selected by the user. The particular control switches operated and the state of the system determine what action is then taken, e.g. deleting the selected element from the display, displaying the attributes of the selected element, initiating a search in the ER theory for a rule with an element matching the selected element, highlighting the selected element, etc.

System Operation

The present invention is normally used in a system in which a substantial domain theory and corresponding ER theory already exist, and provides a semi-diagrammatic way of constructing a new rule. The process is divided into two major phases: in the first phase, the user enters into the system the various conditions or constraints which the rule is to express; in the second, the system automatically constructs the new rule from those constraints. In the first phase, a display from the ER theory is used as the source of at least some of the conditions or constraints.

First Phase

To initiate the first phase, the user must first call up the ER diagram and move the window around it until a portion resembling the new rule is located. This is then used as a source of information to build up the conditions which will form the new rule. These conditions are obtained from the ER diagram by the user selecting items graphically, to the extent that this is possible. As will be seen, however, some non-graphical input will also generally be required in order to build up the complete set of conditions.

The present system will be explained by discussing a particular example. This will be followed by a detailed pseudo-code description of phase I. It is assumed that the domain is a complicated accounting system, and that the rule to be constructed and added into the domain theory is "discounts booked to account 1296 if the discount type is one of a set (typeA, typeB) and if the discount occurs on an invoice which has the order_type T3." It will also be assumed that in the associated ER theory, the ER diagram shown in FIG. 2 has been located and selected as the appropriate ER diagram to use. In other words, this particular part of the ER theory most closely resembles the new rule which is to be constructed. (The test for the closest resemblance is a subjective one which depends on the user's judgment.)

In the first phase of generating the desired new rule, the user has to assemble together all the conditions which are together equivalent to the rule. For conditions which have a graphical representation, the user does this by selecting items from the ER diagram. As these items are selected they are added to a notepad 16 (FIG. 1).

FIG. 3 is a flowchart for the process of building up a description of a rule on the notepad. The process is a loop which is passed round each time a fresh condition is added to the notepad, going down the left-hand branch for entities and relationships and the right-hand branch for attribute conditions.

In the case of selecting entities or relationships from the diagram (the left-hand path in FIG. 3), the process is straightforward. The desired rule concerns the booking of discounts to accounts, so the user can start by selecting the entities "discount" and "account" and the relationship "books_to" between them. (That is, the user moves the marker (not shown) to lie over the "discount" entity box by means of the mouse, and then operates a switch on the mouse to select that entity, and repeats the process for the "account" entity and the "books to" relationship.) The system automatically emphasizes the selected elements on the display 14. The user can of course deselect an element if it has been selected in error.

In fact, if a relationship is selected, the system preferably then automatically selects the entities which it connects as well. Thus the selection process can be simplified by selecting the relationship first; the entities are then automatically selected with it.

The display device 14 preferably includes several display areas, one of which, 14A, is used to display the ER diagram (FIG. 2). A second area 14B is used to display the elements currently being selected, and a third area 14C is used to display the totality of items so far selected. Thus at this point the second and third areas have the displays shown in FIG. 4, these both being the same. The display in area 14B matches the emphasized elements of the display in area 14A (the full ER diagram). (For convenience, the remaining graphical elements of the ER diagram are also shown, in broken form, in FIGS. 4 to 8.)

When the user is satisfied with the selection, he or she then presses another switch on the mouse to confirm the selection. The system then enters the selected items into the notepad 16. More precisely, as the various elements are selected, so their corresponding rules in the ER theory are identified by the logic unit 13, and when the selection is confirmed, that unit copies these rules into the notepad 16. The emphasized elements on the ER diagram (FIG. 2) are automatically de-emphasized at the same time.

With reference to FIG. 3, the logic unit 13 passes from the start block 30 to the read input block 31, and waits in that state until the selection is confirmed. It then checks the selected rules, block 32, to see whether any of them are attributes. In this instance none of them are, so it copies the selected rules to the notepad, block 33. It then checks to see whether the assembly of conditions is finished, block 34. (This state is signalled by an input signal from the user.) In this instance, the assembly of conditions is not finished, so the system returns to block 32 to await the entry of further conditions. The notepad contents are therefore as follows (the asterisks "*" indicate the conditions which have just been entered):

| Notepad contents |
|---|
| *   n1: conclusion(relationship(r4, books_to, e3, e4, n:1)) |
| *   n4: entity(e3, discount). |
| *   n5: entity(e4, account). |

It will be noticed that the relationship r4 has been entered in the notepad not simply as a relationship but as a conclusion. This is because in the particular example we are considering, the rule to be constructed has to have a specific conclusion, as will be seen in due course. The user has to identify which of the conditions being entered into the notepad is to be the conclusion, e.g. by keying in a suitable signal on the controls unit 15. The system preferably constrains the possible choice of conclusion, e.g. by permitting only relationships and not entities or attributes as possible conclusions. The conclusion is preferably distinctively identified on the display unit 14, e.g. by a distinctive color on the display 14C.

The desired rule also concerns invoices having discounts. The user therefore next selects the entity "invoice" and the relationship of this entity to the entity "discount". This gives the displays shown in FIG. 5. Confirming this selection causes another pass round the left-hand side of the loop of FIG. 3. Accordingly, the display area 14B is cleared, all elements in display area 14A are de-emphasized, and the notepad contents become:

---
Notepad contents n1: conclusion(relationship(r4, books_to, e3, e4, n:1))
  n2: relationship(r2, has, e1, e3, 1:no))
  n3: entity(e1, invoice).
  n4: entity(e3, discount).
* n5: entity(e4, account).
---

The two relationships required for the desired rule have now been defined, but the attribute constraints must now be entered. This process is more complicated (right-hand side of FIG. 3). The user has to specify an expression constraining or defining the attribute. The present system provides an attribute constraint language which is implemented by a menu driven input sequence. This menu driven approach ensures that only syntactically valid attribute constraints can be constructed. A number of languages can be used for defining the constraints; a suitable one is given by Table III (in which it will be realized that the vertical bar represents logical OR).

TABLE III
---
Attribute Constraint Language

Con          : : =Operator value
    Operator: :=not SimpleOperator | Simpleoperator
    SimpleOperator:=> | < | >= | <= | = |
    is_in_the_set
        Value::=Numeric | Constant | Set
        Numeric::=Numeric Numeric | 0–9 |
        Constant:: Constant Constant | a–Z |
        Set ::=[ SetItems ]
        SetItemsItem:=Item | Item, SetItems
        Item:: =Numeric | Constant
        Examples of valid constraints expressed in this
    language are:
        not is_in_the_set [manufacturing, sales,
        distribution]
        = 244
        not >= 50000
---

In the present example, there are three attribute constraints which have to be entered, relating to the particular account (account number), the account type, and the invoice order type. Taking the account number first, the user selects the attribute "number" for the entity "account" on the display 14A. This results in the attribute being copied to the notepad 16 (block 35, FIG. 3) as the start of a fresh item. The menu driven input sequence is then displayed on the display device 14 (block the sequence asking for an attribute identifier to be entered. In this case, rule p20 specifies that the identifier is numeric, and this selects the appropriate part of the input sequence so that the user is prompted to enter a numeric value. (The input sequence rejects a non-numeric value.) When the value is entered, it is copied to the notepad to complete the item. Thus the new display state is as shown in FIG. 6, and the new notepad state is:

---
Notepad contents n1: conclusion(relationship(r4, books_to, e3, e4, n:1))
  n2: relationship(r2, has, e1, e3, 1:n0))
  n3: entity(e1, invoice).
  n4: entity(e3, discount).
  n5: entity(e4, account).
* n6: attribute_def(a6, [=, 1296]).
---

The user next selects the attribute "type" for the entity "discount" and the loop of FIG. 3 is repeated round the right-hand path again, with the user being prompted to enter the values "typeA" and "typeB" as the value of "is_in_the set" attribute of the entity "discount", so that the display is as in FIG. 7 and the system state is now:

---
Notepad contents n1: conclusion(relationship(r4, books_to,
  e3, e4, n:1)) n2: relationship(r2, has, e1, e3, 1:n0))
  n3: entity(e1, invoice).
  n4: entity(e3, discount).
  n5: entity(e4, account).
  n6: attributedef(a6, [=, 1296]).
* n7: attributedef(a5, [ is_in_the_set,
  [typeA, typeB]]).
---

The process is repeated once more for the attribute "ordertype" of the entity "invoice" with the user selecting that attribute and entering its value "T3", so that the display is as shown by FIG. 8 and the system state is:

---
Notepad contents n1: conclusion(relationship(r4, books_to,
  e3, e4, n:1)) n2: relationship(r2, has, e1, e3, 1:n0))
  n3: entity(e1, invoice).
  n4: entity(e3, discount).
  n5: entity(e4, account).
  n6: attributedef(a6, [=, 1296]).
  n7: attributedef(a5, [ is_in_the_set,
  [typeA, typeB]]).
* n8: attributedef(a2, [=, T3]).
---

This completes the first phase of the process. The following is an alternative pseudo-code description of phase 1. In the following english-like pseudo-code description there is a variable naming convention. All variables begin with a capital letter and appear as either the part of a structure (e.g.: domain(X,Y)) or in an assignment statement or expression (e.g.: V :=Var, V != "p"). The various theories which are part of the system are named using capital letters, but are not variables.

---
1: wait for a mouse click,
    the underlying graphics system identifies the
        X,Y co-ordinates where the mouse has been
    clicked
        if the user has selected the "exit" button then
            go to block 7
        else
            find an element in the ER picture theory where
    X,Y are on the element
            draw the identified element in the
    Notepad window
            do block 2 (Identify the ER theory element
    corresponding to the identified ER picture
                element )
        End of block
---

(Note: drawing the identified element in the Notepad window is an echoing process -the same line, rectangle, text is drawn in the Notepad window.) (There are numerous ways of allowing the user to select "exit". The current description assumes a standard graphical user interface method, having a graphic image of a button for the user to click upon).

```
2: identify the ER theory element corresponding to the ER
picture element selected
    if the selected element E = rectangle(RX,
X,Y,W,H,C)
        then go to block 3 mapEntity( E, ER-Theory)
        else
            if E = line(LX, X1,Y1,X2,Y2,C)
                then go to block 4 mapRelationship( E,
ER-Theory)
                also if E = text(TX, X,Y,C,T)
                    then go to block 5 mapAttribute( E,
ER-Theory)
```

(Note: The principle of this block is that every ER picture element has, as part of its data structure, an identifier which matches one or more identifiers in ER theory elements. For example for every rectangle (X,Y,Z) there is in the ER theory an element entity (X,Y) where X is the identifier which matches with the rectangle identifier X.)

```
3: mapEntity (rectangle(RX, X, Y, W, H, C), ER-Theory)
        find an element E of the ER-Theory of the form
entity(EX, T) etc where
            EX = RX
        add the element E to the Notepad theory
    end of block
4: mapRelationship (line(LX, X1, Y1, X2, Y2, C),
ER-Theory)
        find an element E2 of the ER-Theory of the form
relationship(RX,T,N1,N2,C)
            where LX=RX
        add the element E1 to the Notepad theory
        find the elements E2 and E3 in the ER-theory with
structures entity(N1, X) and entity(N2,Y)
            where N1 and N2 match with the corresponding
variables in the element E1
        add E2 and E3 to the Notepad theory
    end of block
5: mapAttribute (text(TX,X,Y,C,T), ER-Theory)
        find an element E of the ER-Theory of the form
attribute(AX, E, T) etc
            where TX = AX
        add E to the Notepad theory
        find an element E2 of the ER-Theory of the form
domain(AX,Y) where AX is
            the same as the name of the attribute (ie: the AX
in attribute(AX,E,T))
        add domain(AX,Y) to the Notepad theory
        go to block 6
    end of block
6: find the element domain(X,Y) in the notepad which
corresponds to the
            attribute(Attribute_Name, E, T) which is having a
constraint defined.
        if Y = enum( Set ) then
            ask the user to enter a set constraint
        also if Y = numeric then
            ask the user to enter a numeric constraint
        else if Y = constant then
            ask the user to enter a constant constraint
        call the resulting input the User_input_expression
        add attribute_def(Attribute_Name,
User_input_expression) to the Notepad theory
```

(Notes: The Y part of domain (X,Y) specifies which data type is appropriate to constrain the selected attribute. The attribute language in table III specifies the allowable constraints which can be input. This language is used to prompt the user for appropriate input, for example through menu based selection. For example in the case where the domain is of type numeric then the appropriate operators which can be used are =, >, <, >=, <= and not. A menu can be generated automatically to allow the user to choose one of these. Hence the attribute language in Table III can be used to automatically ensure that the user expression built up is syntactically and semantically coherent. Extensions can easily be made to this language in order e.g.: to cope with other types of data such as dates.)

```
7: exit process
    request that the user selects a concluding relationship
in the notepad window
        wait for mouseclick
        find an element E in the ER picture theory
line(LX,X1,Y1,X2,Y2,C) such that the
            X,Y coordinates of the mouseclick fall on the
line denoted by ?E
        find the element E2 in the notepad theory
relationship(R,T,E1,E2,C) such that
            R=LX
        add conclusion(relationship(R,T,E1,E2,C)) to the
Notepad theory
    end of block (and end of phase1)
```

(Note: Selecting the concluding relationship could in principle be done at other times, adding it to the exit process block is simply done to simplify this pseudocode description).

Theory language definitions

The following provides a grammar for the various theories used in phases 1 and 2. These grammars are in addition to the attribute constraint grammar provided in table III.

```
Notepad Theory
Notepad            ::= NotepadClause | Notepad NotepadClause
NotepadClause ::= concl | rel | domainExpression | attrDef
| ent | entPattern
concl              ::= conclusion ( rel )
domainExpression   ::= domain(A, TypeDefinition)
TypeDefinition     ::= enum setDefinition | alphanumeric
rel                ::= relationship(R,N,E1,E2,Card)
ent                ::= entity(E,T)
attrDef            ::= attribute_def(A, ConstraintDef)
entPattern         ::= entity_pattern(Ename, Pattern)
Pattern            ::= name ( PatternParts )
PatternParts       ::= partName ( Variable ) | partName (
Variable ) PatternParts
ConstraintDef      ::= (see Table III for this definition)
setDefinition      ::= { setElements }
setElements        ::= null | element | element
setElements
Card               ::= Celement : Celement
Celement           ::= 1 | n0 | n
element            ::= alphanumeric
R,N,E1,E2,E,T,A, name, partName, Variable, ::=
alphanumeric
alphanumeric       ::= a–z | 0–9 | a–z alphanumeric | 0–9
alphanumeric
ER Theory
ERTheory           ::= ERTheoryClause | ERTheory
ERTheoryClause
ERTheoryClause     ::= rel | domainExpression | attrib | ent |
entPattern
domainExpression   ::= domain(A, TypeDefinition)
TypeDefinition     ::= enum setDefinition | alphanumeric
rel                ::= relationship(R,T,E1,E2,Card)
ent                ::= entity(E,T)
attrib             ::= attribute(A, E, T)
entPattern         ::= entity_pattern(Ename, Pattern)
Pattern            ::= name ( PatternParts )
PatternParts       ::= partName ( Variable ) | partName (
Variable ) PatternParts
setDefinition      ::= { setElements }
setElements        ::= null | element | element
setElements
Card               ::= Celement : Celement
Celement           ::= 1 | n0 | n
element            ::= alphanumeric
```

```
R,N,E1,E2,E,T,A, name, partName, Variable,
alphanumeric
alphanumeric          ::= a-z | 0-9 | a-z alphanumeric | 0-9
alphanumeric
ER Picture theory
ERPictureTheory       ::= ERPictureTheoryClause |
ERPictureTheory ERPictureTheoryClause
ERPictureTheoryClause ::= rectangleDef | lineDef | textDef
rectangleDef          ::= rectangle(E,X,Y,W,H,C)
lineDef               ::= line(Rel, X1, Y1, X2, Y2, C)
textDef               ::= text(E, X, Y, C, T)
E,C,Rel,T             ::= alphanumeric
X,Y,X1,Y1,X2,Y2,W,H   ::= numeric
alphanumeric          ::= a-z | 0-9 | a-z alphanumeric | 0-9
alphanumeric
numeric               ::= 0-9 | 0-9 numeric
```

Second Phase

When enough information has been defined in the notepad, the second phase of the process is entered, in which the information is used to generate a rule. That is, the information in the notepad must be manipulated into a form which complies with the formal requirements for rules in the domain theory, and can be assimilated into that theory. This process is a kind of compiling; the contents of the notepad define the required rule in one of language, which must be compiled into a rule in the domain theory language.

The main body of this process is carried out by a rule assembly logic unit 17 (FIG. 1), which is a compiler processor. Its operation is described with reference to FIG. 9, which is a data flow diagram for rule construction.

The process starts at block 40, find conclusion and antecedents (antecedents are any other relationships besides the conclusion). This looks in the Notepad and then selects from it n1 and n2 data flow F0. These items are then output from block 40 as dataflow F2.

```
F2  n1: conclusion(relationship(r4, books_to, e3, e4, n:1)).
    n2: relationship(r2, has, e1, e3, 1:n0).
```

This is followed by the process of block 41, locate entity patterns. This extracts the entity patterns corresponding to the entities which are present in the Notepad, arriving via dataflow F4. The process of block 41 then extracts the entity_patterns corresponding to these entities from the ER theory (data flow F1). Block 41 concatenates the contents of data flow F2, the entities in

```
F4    n3: entity(e1, invoice).
      n4: entity(e3, discount).
      n5: entity(e4, account).
```

The process of block 41 also obtains, from the ER theory, the entity patterns corresponding to those entities, thus generating data flow F1.

```
F1  p21: entity_pattern(e1, invoice(date(D), ordertype(0))).
    p23: entity_pattern(e3, discount(value(V), type(T))).
    p24: entity_pattern(e4, account(number(N))).
```

The resulting data flow from the process of block 41 is F5.

```
F5  n1: conclusion(relationship(r4, books_to, e3, e4, n:1)).
    n2: relationship(r2, has, e1, e3, 1:no).
    n3: entity(e1, invoice).
    n4: entity(e3, discount).
    n5: entity(e4, account).
    p21: entity_pattern(e1, invoice(date(D),
         order_type(0))).
    p23: entity_pattern(e3, discount(value(V), type(T))).
    p24: entity_pattern(e4, account(number(N))).
```

The next process is that of block 42, find attribute constraints. This process extracts the attribute constraints from the notepad. Thus this generates the data flow F3. The block 42 completes by copying F3 to its output F6.

```
F3  n6: attribute_def(a6, [, 1296]).
    n7: attribute_def(aS, [is_in_the_set, [typeA, typeB]]).
    n8: attribute_def(a2, (=, 'T3']).
```

This is followed by the process of block 43, construct attribute subgoals. In this process, an appropriate Prolog goal is created for each of the attribute constraints. Variable names are generalized and the operators in the attribute constraint language are replaced with Prolog predicates. For example, the attribute constraint language operator "is—in—the—set" is converted to the binary Prolog predicate member (X, Y).

All of the variables generated are simply called Var here, though in an actual Prolog implementation they would all have .unique names. This is unimportant, as the variables only function as placeholders until we reach the process of block 45, where variables are "renamed" by unification.

The effect of the process of block 43 is therefore to generate the data flow F7.

```
F7     Var = 1296.
       member(Var2, [typeA, typeB]).
       Var3 = 'T3'.
```

The next process is that of block 44, construct rule. This process combines the data flows F5 and F7 in the following way.

First, for each conclusion or antecedent, a binary subgoal is created by using the name of the relationship as the predicate symbol and by inserting the appropriate entity pattern as each of the two arguments of the predicate. For example, taking the conclusion and the two associated entity patterns from F5:

```
n1: conclusion(relationship(r4, books_to, e3, e4, n:1)).
p23: entity_pattern(e3, discount(value(v), type(T))).
entity_pattern(e4, account(number(N))).
```

We first create the binary predicate thus:

books_to (Something1, Something2).

and then make each of the arguments take the value provided by the entity_pattern, thus:

books_to(discount(value(V), type(T)),
account (number (N))).

Second, a rule is then built by combining these binary subgoals with the attribute subgoals (from data flow F7). These elements are combined in the following order:

the conclusion binary subgoal the Prolog implication symbol ':-' the remaining binary subgoals, if any the attribute subgoals the Prolog clause terminator '.'

If there are no subgoal patterns or attribute subgoals, - the following are concatenated to form the rule:

the conclusion binary subgoal
the Prolog implication symbol ':-'
the constant 'true'
the Prolog clause terminator '.'
(The details of this process are specific to Prolog, but rules for other languages could be constructed in the same general manner, changing only the details of this process).

In the case of our example the output generated by this process is data flow F8, which is an unlinked rule.

```
F8  books_to(discount(value(V), type(T)), account(number(N))) :-
        has(invoice(date(D), order_type(O)),
        discount(value(V), type(T)))),
        Var = 1296,
        member(Var, [typeA, typeB]),
        Var = 'T3'.
```

The final process of phase 2 is that of block 45, rename variables, which links together the appropriate variables. This process has two steps. First, the variables in binary subgoals are renamed. This ensures that the appropriate variables are shared between entities linked by relationships. Second, the variables in attribute goals are renamed. This connects the variables in attribute subgoals to the appropriate variables in the conclusion and other binary subgoals.

The result of the process of block 45 in our example is the linked rule of data flow F9.

```
F9  books_to(discount(value(v), type(T)), account(number(N))) :-
        has(invoice(date(D), ordertype(O)),
        discount(
        value(V), type(T)))),
        N = 1296,
        member(T, [typeA, typeB]),
        O = 'T3'.
```

The rule assembly logic 17 also checks that the rule being assembled will be well-formed; for example, all the entities selected must be connected into a single network by the relationships selected. This condition will normally be satisfied, because it is unlikely that the user will deliberately select a combination of entities and relationships which do not satisfy this condition.

The final stage of this second phase, once the linked rule has been constructed, is performed by an assimilator unit 18, FIG. 1. The domain theory has an associated domain assimilator theory, and the assimilator unit 18 uses this domain assimilator theory to insert the new rule into the domain theory, which is held in unit 19. Similarly, the ER theory has an associated ER assimilator theory, and the assimilator unit 18 uses this ER assimilator theory to insert the new rule into the ER theory, which is held in units 11 and 12. (In the example discussed, the ER assimilator theory will find that the ER theory does not need to be changed, since it already contains everything necessary to express the relationships of the new rule.)

Phase 2 - pseudocode description.

Figure 9:
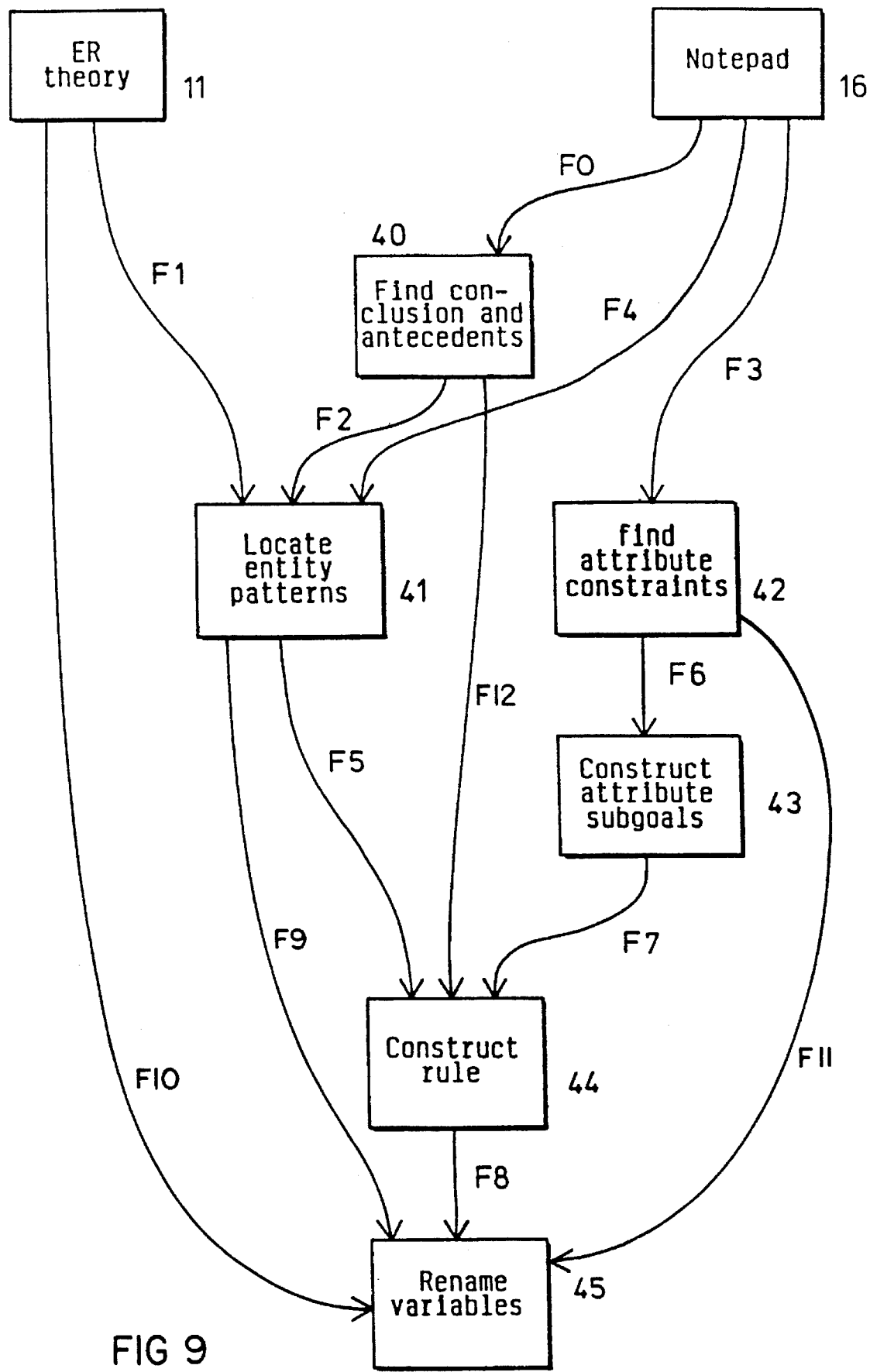
FIG. 9 is a data flow diagram of the second phase of the operation of the system.

This description is consistent with the dataflow diagram FIG. 9. Note that in this description names of the form FX, where X is a number are not variables but correspond to the dataflows in FIG. 9.

```
40: find conclusion and antecedents
        construct F0 by
            finding in the Notepad the element E with the
        form conclusion(C)
            find in the Notepad the set of elements S where
        each element of S has the
                    form relationship(R,N,E1,E2,C) and
        copy F0 to F2 and output F2
            copy F0 to F12 and output F12
        end of block
41: locate entity patterns
        find in the Notepad the set of elements S where each
    element of S has the
            form entity(E1,T), this comprises F4.
        for each element entity(E1,T) in S find in the ER
    theory the element entity_pattern(E2,P)
            where E1 = E2 and add the located
    entity_pattern(E2,P) to dataflow F1.
        construct F5 from the input F2 plus F1 and F4 and
    then output F5
            copy F5 to F9 and output F9
        end of block
42: Find attribute constraints
        find in the Notepad the set of elements S where each
    element of S has the
            form attribute_def(A,C) this comprises F3.
        copy F3 to F6 and output F6.
        copy F3 to F11 and output F11
        end of block
43: Construct attribute subgoals
        for each element attribute_def(A, C) in input dataflow
    F6 do
            if C is of the form [is_in_the_set, S]
                generate a subgoal of the form member(Var,
    S).
                add the result to F7
            else if C is of the form [not is_in_the_set] then
                generate a subgoal of the form
    not(member(Var, S)).
                add the result to F7
            else if C is of the form [Operator, X] then
                generate a subgoal of the form Var Operator X.
                add the result to F7
            else if C is of the form [not, operator, X]
        then
                generate a subgoal of the form not(Var
    Operator X).
                add the result to F7
        end for
        end of block
```

(Notes: It is a feature of prolog based systems that every variable generated is unique, i.e.: has a system created name different from the rest. Hence in the output F7 all of the Var(s) are different. In another language the above code would have to keep a record of the Var(s) generated so far and would have to include code to generate a new Var each time which is unique.)

```
44: construct rule
        for each element E of F12 do
            if E = relationship(R,T,E1,E2,C) then
                find in F5 the element P1 where P1 =
    entity_pattern(E1, Pattern1) and
                find in F5 the element P2 where P2 =
    entity_pattern(E2, Pattern2) and
                generate a binary subgoal of the form
    T(P1,P2).
                add this subgoal to SetOfSubgoals
            else if E = conclusion(relationship(R,T,E1,E2,C))
        then
                find in F5 the element P1 where P1 =
    entity_pattern(E1, Pattern21) and
                find in F5 the element P2 where P2 =
    entity_pattern(E2, Pattern2) and
                generate the rule conclusion with the form
    T(P1,P2).
        end for
        if F7 contains no attribute subgoals (F7 is empty)
    and the SetOfSubgoals is empty then
            construct the rule by concatenating (+) the
```

-continued

```
    following elements
        Rule := rule conclusion + ':-' + 'true' +
'.'
    else construct the rule by concatenating (+) the
    following elements
        Rule := rule conclusion + ':-' +
SetOfSubgoals + F7 + '.'
        add the resulting ?Rule to F8
    end of block
```

(Note: For simplicity this glosses over the following syntactic point. When the various elements are being concatenated successive Subgoals and attribute subgoals have to be separated by commas to be valid Prolog. i.e.: If the subgoals were X=1 and Y=4 then the part of the rule following the conclusion is constructed thus:- X=1, Y=4.)

```
45: rename variables
    Rule := the rule in F8
    for each entity pattern P in F9 do
        for each binary subgoal G(P1, P2) in Rule
        where G != "not" and G != "member" do
            if P unifies with P1
                Rule := Rule which has had P
unified with P1
            else if P unifies with P2
                Rule := Rule which has had P
unified with P2
        end for
    end for
    for each attribute subgoal S in Rule do
        find in F6 the attribute_def(A, C) which was used
to generate S : dataflow F11
        find in ER theory the attribute(A,E,T) which
corresponds to attribute_def(A,C)
            dataflow F10
        find the entity_pattern(E, P) which corresponds
to attribute(A,E,T) : dataflow F9
        find in P the element T(Var)
            unify the variable in S with Var
        if the conclusion in Rule = Pred(X,T(V) ) or
Pred (T(V) ,X)
            then unify Var vith V
        for each binary subgoal B in Rule
            if B = ( Pred(X,T(V) ) or Pred(T(V) ,X) )
                then unify Var with V
        end for
    end for
    end of block (and end of phase 2)
```

(Notes: This block utilizes the built in process of "unification" which is a feature of the prolog language. This causes differently named variables in a similar position in a similarly structured clause to be effectively joined together or unified. e.g.: predicate(X, Y) and predicate(Z,Z1) can be unified by writing the following predicate(X,Y), predicate(Z,Z1), X=Z, Y=Z1. This has the effect of automatically renaming the variables, so the above statement could be re-written as predicate(X1,Y1), predicate(X1,Y1), X1=X1, Y1=Y1, where X1 and Y1 are new system created variable names. In most PROLOG implementations it is not possible to get at the predicate part of a structure such as predicate(Var1, Var2) by writing P(Var1,Var2). However this is possible in IC-PROLOG from Imperial College and can be achieved in other Prologs using slightly more indirect means.)

General Remarks

It will be realized that the system can also be used for rule deletion, i.e. for deleting a rule from the domain theory. This process is considerably simpler than the process of creating and adding a new rule. To delete a rule, the ER diagram is displayed, and moved until the relationships relating to the undesired rule are located. These relationships are then used as goals for searching the domain theory for rules which match them. These rules are displayed for inspection. It is safest if the display is textual (though the rule can of course be interpreted and displayed in a form which is more readily understandable than the pure Prolog form), but this display can be accompanied by a display of the type shown in the lower half of FIG. 8, in which substantially all the information incorporated in the rule is shown. Once the desired rule has been found, it is deleted from the domain theory, using the domain assimilator theory.

The deletion of a rule from the domain theory may result in some of the rules of the ER theory becoming superfluous. It may be desirable for the ER theory to be updated as well, so that the correspondence between the domain and ER theories is maintained. The rules in the ER theory associated with the domain theory rule being deleted are known, and are therefore candidates for deletion. However, these rules must be checked against all the other rules in the domain theory, to determine whether any of them are associated with any other domain theory rules as well. An ER theory rule can only be deleted if there are no remaining domain theory rules associated with it.

Alternatively, the ER theory may be left unchanged. Although this will occasionally result in some rules remaining in the ER theory when there are no corresponding rules in the domain theory, this will not normally have any significant adverse effects. The ER theory will then serve equally well for all the different historical versions of the domain theory. Also, it will be advantageous to retain those rules in the ER theory, in case a new domain rule is required in the future which incorporates the substance of such ER theory rules.

The system has been described above on the assumption that there is a single domain theory and a single ER theory, the two theories being coextensive (within the limits discussed above). However, the system can operate under a considerably weaker form of assumption, since all that is required is that some part of the ER theory should correspond to some part of the domain theory. In particulars it may be desirable for the ER theory to extend beyond the domain theory. A specific instance has been discussed above, arising out of rule deletion. A much more general situation is where there are several different domain theories, concerned with distinct domains. If the subject matters of the various domains are sufficiently closely related, it may be preferable to have a single ER theory common to all the domain theories than to maintain several distinct but similar ER theories. The situation which arises when different historical versions of a domain theory are all maintained, as discussed above, can be regarded as a specific example of this, since the different versions are in a strict sense different theories. In effect, the ER theories corresponding to the individual domains are combined into a single broader ER theory common to all the domains.

A much more radical change of assumption can be made than that discussed in the previous paragraph. The previous discussion has been based throughout on the assumption of the primacy of the domain theory, with the ER theory being subordinate to it. That approach tends to restrict the understanding of the principles of the system; fuller understanding can be gained by regarding the ER theory as basic, with the domain theories being constructed using the ER theory. In other words, the ER theory can be considered more abstractly to be a language for constructing a certain class of domain theories.

As an analogy, consider a set of red toy building bricks. They can be used to build a large number of different red buildings, but a green building will never be generated as the color green is not in the "vocabulary". The ER theory provides a similar vocabulary which constrains but does not prescribe the set of domain theories which can be built. Alternatively consider the laws of algebra in mathematics. We can consider these laws to be equivalent to the ER theory. Various mathematical systems may be constructed on the foundation provided by these laws, corresponding to domain theories.

These analogies have properties which reflect on the relationship between ER and domain theories. Above all there is the notion that the ER theory provides a foundation for domain theories and is prior to them. We can thus see that deleting information from a domain theory will not necessitate a corresponding update in the ER theory. This would correspond to a change in a mathematical system causing a law of algebra to change, which is usually nonsense. Hence even if all the rules are removed from a domain theory, the corresponding ER theory will remain unaltered.

On the other hand, if we change some of the rules in the ER theory, this may make some of the rules in the domain theory invalid. In this case we would have to be aware of the potential effects of such a change. In this situation, the computer system should signal when a change in the ER theory necessitates a corresponding change in a domain theory.

Although a particular embodiment of the invention has been shown and described and various modifications have been suggested, it will be appreciated that other embodiments and modifications will occur to those of ordinary skill in the art which will fall within the true spirit and scope of the appended claims.

What is claimed is:

1. Apparatus for constructing a new rule for a domain theory having an associated entity relationship (ER) theory represented by data stored in a file which relates to the domain theory and which can be represented diagrammatically, wherein said domain theory includes on or more existing rules, comprising:

(a) display means for displaying visual elements for an ER diagram representing the ER theory;

(b) constraints storage means for storing constraints;

(c) control means for selecting said visual elements of the ER diagram, means for entering constraints relating to said selected visual elements and storing said related constraints involving the said selected visual elements in said constraints storage means; and (d) rule assembly means for automatically generating the new rule from a relevant portion of the ER theory data corresponding to said selected visual elements and said related constraints stored in said constraints storage means.

2. The apparatus of claim 1, further comprising means for displaying a plurality of entities and relationships between entities in the ER diagram.

3. The apparatus of claim 2, wherein said control means comprises means for selecting a relationship from the ER diagram and selecting entities linked by that relationship.

4. The apparatus of claim 2 or 3, wherein the ER theory includes information relating to attributes of its entities and/or relationships, and further comprising means for displaying said attributes.

5. The apparatus of claim 4, wherein said control means enters selected attributes in said conditions storage means, and further comprising constraint means for constraining the entry of attributes when an attribute is selected.

6. The apparatus of claim 5, further comprising means for displaying attribute constraints.

7. The apparatus of claim 1, 2 or 3, wherein said display means is divided into a plurality of areas, wherein one area displays the ER diagram and at least one other area displays the entities and relationships currently selected and/or entered into the conditions storage means.

8. A method for constructing a new rule for a domain theory having an associated entity relationship (ER) theory represented by data which relates to the domain theory and which can be represented diagrammatically, wherein said domain theory includes one or more existing rules, comprising the steps of:

(a) displaying an ER diagram obtained from the ER theory;

(b) selecting elements of the ER diagram and related expressions for use in constructing a new rule;

(c) storing the selected elements and related expressions as stored conditions indicative of a new rule; and (d) generating the new rule from at least the stored conditions.

9. The method of claim 8, further comprising displaying, in the ER diagram, a plurality of entities and relationships between the entities.

10. The method of claim 9, further including the step of selecting a relationship from the ER diagram and selecting entities linked by said relationship.

11. The method of claim 9 or 10, wherein the ER theory includes information relating to attributes of its entities and/or relationships and further comprising displaying said attributes.

12. The method of claim 11, further comprising constraining the entry of an attribute when the attribute is selected.

13. The method of claim 12, further comprising displaying a representation of the constraint placed on the entry of the attribute.

14. The method of claim 11, further comprising entering an attribute and displaying the entered attribute in the ER diagram.

15. The method of claims 8, 9 or 10, wherein the displaying step comprises the steps of displaying the ER diagram in one area and displaying the entities and relationships currently selected/or stored in at least one other area.

\* \* \* \* \*